United States Patent [19]

Bechthold et al.

[11] 4,039,304
[45] Aug. 2, 1977

[54] METHOD OF REMOVING SO₂ AND/OR OTHER ACID COMPONENTS FROM WASTE GASES

[75] Inventors: Horst Bechthold, Erftstadt-Friesheim; Paul Bottger, Bensberg-Refrath, both of Germany

[73] Assignee: Walther & Cie Aktiengesellschaft, Cologne-Delbruck, Germany

[21] Appl. No.: 591,624

[22] Filed: June 30, 1975

[30] Foreign Application Priority Data

June 28, 1974 Germany .................... 2431130
Apr. 25, 1975 Germany .................... 2518386

[51] Int. Cl.² ............ B01D 53/14; B03C 1/00; C01B 17/00
[52] U.S. Cl. ............................... 55/10; 55/73; 55/89; 423/242
[58] Field of Search ............... 55/10, 73, 122, 124, 55/11, 89; 210/38 A; 423/242, 512 A, 554, 555

[56] References Cited

U.S. PATENT DOCUMENTS

| | | | |
|---|---|---|---|
| 2,598,116 | 5/1952 | Du Bois | 55/73 |
| 2,628,193 | 2/1953 | D'Alelio | 210/38 A X |
| 3,305,307 | 2/1967 | Spormann et al. | 423/512 A |
| 3,405,508 | 10/1968 | Peters et al. | 55/73 |
| 3,456,709 | 7/1969 | Vegeby | 55/122 X |
| 3,485,014 | 12/1969 | Atsukawa et al. | 55/73 |
| 3,772,854 | 11/1973 | Tamura et al. | 55/73 |
| 3,785,119 | 1/1974 | McIlvaine | 55/73 X |
| 3,907,526 | 9/1975 | Saleem et al. | 55/73 X |
| 3,932,587 | 1/1976 | Grantham et al. | 423/242 |

*Primary Examiner*—Thomas G. Wyse
*Assistant Examiner*—Robert H. Spitzer
*Attorney, Agent, or Firm*—Michael J. Striker

[57] ABSTRACT

Waste gas is contacted with a solution of a salt from a pollutant of the gas. This solution is obtained from another stage of the process used for cleansing or purifying the gas. The resulting mixture of gas and solution is subjected to vaporization so as to obtain a dry gaseous substance constituted by the waste gas and the evaporated solvent for the salt. The gaseous substance thus formed contains crystals of the salt as well as the pollutant present in the original waste gas. The salt crystals and other solid particles are removed from the gaseous substance in the form of a dry solids mixture. The gaseous substance is subsequently mixed with an absorption fluid such as an ammonia solution in order to wash out and redissolve any salt crystals which may remain in the gaseous substance and in order to remove the pollutant present in the original waste gas from the gaseous substance. The pollutant and the redissolved salt crystals form a salt solution together with the absorption fluid and it is this salt solution which is brought into contact with the waste gas. The gaseous substace is exhausted to the atmosphere after being mixed with the absorption fluid.

14 Claims, 1 Drawing Figure

U.S. Patent  Aug. 2, 1977  4,039,304
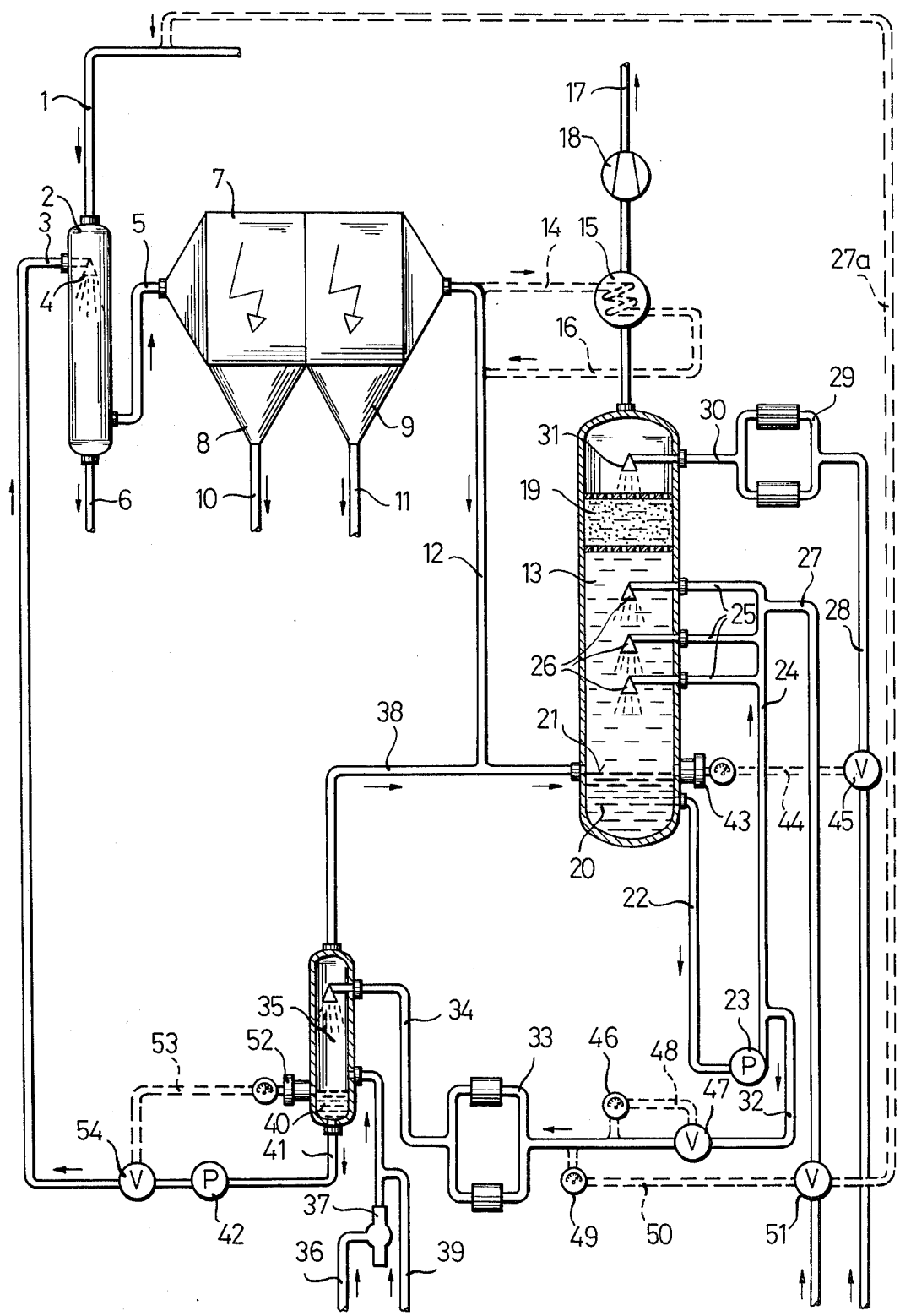

METHOD OF REMOVING SO₂ AND/OR OTHER ACID COMPONENTS FROM WASTE GASES

The invention concerns a method for cleaning of waste gases with acid components or the like, particularly SO₂.

Such methods are intended to carry out with the simplest means an economical cleaning of waste gases.

In most recent times an increasing number of methods has become known which serve the purpose of reducing environmental contamination due to the expulsion of sulfur dioxide from coal and/or oilfed energy and other industrial processes. In the main, these methods may be divided into three groups:

The first group embraces such methods wherein the sulfur dioxide is absorbed in an aqueous solution or suspension, from which it is subsequently liberated in a regenerating stage that this arranged in the circuit. Such processes require, due to the difficult to transport SO₂, in their immediate vicinity an installation capable of further processing (e.g. sulfuric acid factory).

A second group embraces methods which as a rule absorb with a suspension from which the loaded solid matter component is separated and transported into fabrication installations which may be located remotely. The regenerated mass is transported back from the installation for reuse to the point of de-sulfurization.

A third group of methods, which also absorbs in an aqueous phase, rests on the protection of hard to dissolve sulfur-containing salts (sulfite, sulfate) with the aim of depositing the same after separation from the liquid. Aside from the necessity of large separating basins the problem of air contamination is here shifted to soil contamination.

In the most recent time a further method principle has become known, in which injection of appropriate substances (e.g. ammonium) into the still hot waste gas stream causes the sulfur dioxide in the gaseous phase to be brought to reaction and to be subsequently separated as a salt in a filter, jointly with the mechanical contaminations of the waste gases. According to this method only such sulfur-containing salts can be produced, whose initial components are capable of acting with one another in the gaseous phase. The solid constituent not separated in the filter is, moreover, admitted together with the waste gas into the atmosphere and — contrary to the gaseous carbon dioxide — leads to increased environmental pollution due to settling in the immediate vicinity of the chimney. Also, the reaction in the gaseous phase does not lead to crystal formation, because of the large spacing of the individual molecules from one another, but to the formation of an extremely finely divided amorphous product which is extremely difficult to separate in the subsequently arranged filters and — primary in the electro-filters — leads to the formation of clogging which must be removed with the use of water. This, however, produces a new problem on the waste water side.

In order to avoid the disadvantages of the known installations and to carry out with the most simple means an economical waste gas cleaning, the invention suggests a method which is composed of the following individual steps:

a. the waste gases are mixed with a concentrated salt solution which is withdrawn from the process itself, b. the waste-gas-salt solution mixture is evaporated, c. from the dry waste gases dust and salt crystals are removed almost completely as a dry mixture, d. the dry waste gases with the acid components and the not separated salt crystals are mixed with an absorption liquid for absorbing the acid components and for washing-out and re-dissolving of the remaining salt constituents and from this liquid mixture the salt solution is withdrawn which is admixed to the method step under (a), e. the thus treated waste gases are supplied to a waste gas chimney after the absorbing step.

This method produces a dry and economically usable end product. The end product can be practically any inorganic, water=soluble sulfate or sulfite (or a mixture of the two), as long as it is thermally stable in the temperature range of the process and the carbonate of the same cation is also water soluble.

The inventive method combination has the following substantial advantages compared to known methods:

1. The sulfur-containing end product is discharged directly as a dry salt, together with the ash dust from the separator, for example, an electrofilter.

2. Since the salt particles result by evaporation out of their solution, they are substantially larger and therefore more readily separable than those which are developed by reactions in the gaseous phase (e.g. by blowing of ammonium into the hot gas).

3. The salt particles which are not fully separated in the filter are practically completely dissolved again in the absorption stage and thus removed from the waste gas. Thus, the process is practically independent of the degree of separation of the salts which can be obtained in the electrofilter.

4. The process includes none of the usually energy-intensive regenerating stages, which are necessary for all known absorption processes.

5. Compared to processes which operate with regenerable suspensions, the expensive transport of loaded and regenerated masses between the de-sulfurizing and regenerating installation, which are usually located at different areas, is omitted.

6. No mud and waste water problems occur.

7. The use of water soluble salts prevents any danger of clogging of the system and thus increases the operational safety.

Moreover, the advantage of this process which is decisive from economical viewpoints resides in the fact that the total requirement of heat at lowest energy level (waste gas temperature of the upstream boiler installation) is used for the evaporation of the salt solution. In the high degree of effectiveness which is customary in large boilers it is not permissible — because of the proximity of the sulfur dew point — to further drop the waste gas temperature at this location. The boiler exit temperature must therefore be increased in the injection evaporator by the degree of temperature reduction. This means the elimination of the "cold end" at the air preheater of the boiler installation which, because of the low temperature differential, as related to the heat transmitted per unit area, is among the specifically most expensive boiler components.

(The following is the subject matter of pages 9a and 9b of the German text.)

In order to carry out the waste gas cleaning with simplest means and still more economically, it is suggested according to the invention to use ammonia for forming the absorption liquid, which is admitted to the waste gases before or immediately after the mixing with the concentrated salt solution.

Upon the injection of the ammonia ahead of the evaporator the sulfuric acid dew point temperature is dropped so far that it is far below the gas temperature, so that the sulfuric acid dew point danger is eliminated in any subsequently following aggregates. The $SO_3$ which causes corrosions reacts in the gaseous phase with the ammonium and is thereby neutralized.

In the method according to the main claim the predominant portion of the total requirement of thermal energy resides in that the waste gas is cooled by approximately 25° in the injection evaporator. Since the temperature of the sulfuric acid dew point is now maintained far below the gas temperature, and thus corrosion dangers are eliminated with the inventive method, the gas temperature need not be raised again ahead of the evaporator. This means that almost the total heat requirement is supplied from otherwise not usable waste heat. Thus, a de-sulfurization process is obtained which operates almost without any reduction in the effectiveness of the flow so that the total de-sulfurization process can be carried out without any significant utilization of thermal energy.

(Translation resumes with top of page 9).

As against additional apparatuses requires in other methods for the regeneration the present invention involves an extremely low thermal requirement and simultaneously saves the substantial expenses relating to the boiler installation.

The inventive method and further details of the invention are diagrammatically shown in the drawing and more closely described hereafter.

The sulfur-containing waste gas to be cleaned, derived from a not illustrated boiler installation or the like is supplied via a conduit 1 to an injection evaporator 2 to which via a conduit 3 and by means of one or more injection nozzles 4 the concentrated salt solution is sprayed which was obtained during the running of the total process. The heat required for evaporating the waste gas-salt solution mixture is derived from the waste gases, whereby the waste gas entry temperature into the injection evaporator 2 is so high that the total liquid in the mixture completely evaporates. Should the waste gas temperature not be sufficient for evaporation then additional external heat can be supplied to the injection evaporator. The waste gas, which is slightly cooled because of the water evaporation, is supplied to further installation 7 via a conduit 5 (illustrated as an electrofilter in the exemplary embodiment) after at the bottom of the injection evaporator 2 any dust or salt particles which may already have been separated here are removed via a removing device 6. In the filter 7 the dust of the waste gases is largely separated, jointly with the salt crystals which develop during the evaporation in the injection evaporator 2, and withdrawn via hoppers 8 and 9 and conduits 10 and 11. The largely dust and salt-free waste gas is now supplied via a further conduit 12 to an absorption tower 13. If desired, waste gas coming from the filter 7 can also be passed over a heat exchanger and thereby cooled. Preferably, a branch line 14 is provided for this purpose which branches off the line 12 and is separated via heat exchanger 15. From here, a return line 16 leads back to the line 12. In the exemplary embodiment the heat-exchanger 15 is built into the waste gas line 17 for the cleaned waste gas which leads away from the absorption tower 13. In the heat exchanger 15 the completely treated waste gas can be preheated to decrease its saturation level before it is admitted into the not-illustrated chimney, by means of the sensible heat of the preheated gas which issues from the electrofilter 7.

Thus, the cooling of the waste gases supplied to the tower 13 and the preheating of the waste gases leaving the tower 13, are carried out in mutual heat-exchange.

The sulfur oxides (and also possible other acid components) contained in the waste gas leaving the electrofilter 7 are almost completely absorbed in the absorption tower 13 and are converted by chemical reaction with a wash flow into the corresponding sulfites or sulfates. At the same time the salt particles which are not separated in the electrofilter 7 are dissolved again. By means of a blower 18 the cleaned waste gas is withdrawn via the clean gas line 17 and the not illustrated chimney.

The absorption can be carried out practically with any alkaline solution. Advantageously, those cations are employed which form water-soluble sulfites, sulfates and carbonates or bicarbonates, in order to prevent clogging in the total process. From economic viewpoints, particularly sodium and ammonium ions are suitable, and preferably ammonium ions are employed since here the end product — ammonium sulfate — can be used in the artificial fertilizer industry without further cleaning, despite the mixture with simultaneously separated ash dust.

(Follows translation of page 13a).

The absorption means containing the cations can also be supplied to the waste gases via a conduit 27a which leads into the conduit 1. Thus, the absorption means is supplied jointly with the sulfur oxides contained in the waste gas and carried through the installation to the absorption tower 13 and is brought in contact only here with the liquid which is circulated.

(Beginning translation at the top of page 13).

In the absorption stage, which is arranged in the lower part of the absorption tower 13, the salt solution which is separated in a closed circuit is sprayed or intensively brought into contact with the waste gas by means of installations or fill bodies. In the lower portion of the tower 13 a sump 20 forms having a surface 21 and being composed of a concentrated salt solution. Below the surface 21 there is provided a withdrawing conduit 22 with a circulating pump 23 which withdraws concentrated salt solution from the sump 20 and supplies it via a line 24 and one or more distributor lines 25 to one or more spaces 26 within the lower part of the absorption tower 13. Via a line 27 the absorption means containing the cations is supplied to the circulation. For this purpose the line 27 communicates with the line 24. By means of a fresh water line 28 fresh water is supplied to the circulation in order to maintain the water balance. Via the fresh water line 28 the water is advantageously passed by means of an ion exchanger 29 and a feeder line 30 into the upper part of the absorption tower 13. This fresh water also serves at the same time to back-wash possible spray of the absorption means which has been carried along to the upper part of the apparatus, however in the case of ammonia as absorption means, to free the cleaned waste gases of ammonia vapors under formation of ammonium carbonate by reaction with $CO_2$ in the waste gas. These mesures require an intensive contacting of liquid and gas, e.g. by the aid of fill bodies 19 or the like. The fresh water is softened in the ion exchange system 29 in order to avoid the formation of insoluble salts during the absorption process.

The salts which develop during the washing in the absorption tower 13 become enriched in the circulation 20 - 26. To maintain the desired concentration a partial stream is withdrawn from this salt solution and supplied to the injection evaporator 2. For this purpose a branch conduit 32 for the concentrated salt solution is provided, which is connected to the line 24 downstream of the pump 23. For the case that the concentrated salt solution must be freed of mechanical contaminations, a filter stage 33 is provided. In the event that the oxidation of sulfites to sulfates has not already taken place in the absorption tower 13, the salt solution travels via a line 34 to an aerating tower 35 in which the solution mixture of sulfite and sulfate (with a small excess of carbonate) is intensively brought in contact with air in order to obtain the oxidation of the sulfites to sulfates. The air required for this purpose is advantageously fed to the aerating tower 35 by means of a steam stream injector 37 and an air supply conduit 36. The gas mixture that is not needed for the oxidation is withdrawn via a line 38 and mixed to the absorption stage in that the line 38 is connected to the line 12. The air supplied to the aerating tower 35 can be injected with ozone to accelerate the oxidation reaction or can be mixed with another suitable oxidation means, such as for example, hydrogen peroxide. For this purpose a line 39 is provided. The steam and air quantity supplied to the salt solution in the aerating tower 35 are so correlated with one another that the sprayed salt solution can under no circumstances become farther concentrated. Here also, the salt solution collects in the lowermost part of the aerating tower 35 and forms a sump 40. With the aid of a line 41 that is connected to the sump 40 and a pump 42 that is provided, the salt solution is supplied to the injection evaporator 2 via the line 3.

The total process must be regulated, so that any desired temperature-quantity-and concentration change in the waste gas stream can be controlled. The regulation can be carried out as follows, for example:

First the filling level of the sump 20 is measured in the absorption tower 13 and in dependence upon this filling level the fresh water quantity supplied to the circulation of the absorption liquid is regulated. For this purpose, the level of the sump 20 is measured by means of a filling level measuring device 43 and thus the surface 21 determined. Starting from this measuring result, the fed-in fresh water quantity is regulated, via a regulating line 44 and a valve 45 which is installed in the fresh water line 28.

Further, the density or conductivity of the concentrated salt solution withdrawn from the circulation of the absorption liquid can be measured and, based upon this measurement, the salt solution quantity supplied to the injection evaporator 2 can be regulated. For this purpose the branch line 32 for the concentrated salt solution is provided with a measuring device 46 which measures the density of the concentrated salt solution. The density measuring device 46 can also be replaced by a conductivity measuring device. Based upon the density measurement, a regulating line 48 operates a valve 47 installed in the line 32 which influences the salt solution quantity that is supplied to the injection evaporator 2.

In addition the pH-value of the concentrated salt solution that is withdrawn from the circulation of the absorption liquid is measured, and based upon this pH value the quantity of the alkaline component of the absorption liquid which is supplied, is regulated. For this purpose the line 32 is provided with a pH value measuring device 49 from which a regulating line 50 leads to a valve 51 installed in the line 27.

The required regulators are not illustrated.

Finally, the salt solution quantity which flows out of the aerating tower 35 via line 41 is accommodated, via a regulation, to the inflow of salt solution quantity based upon a sump measurement in the aerating tower 35. A further filling level measuring device 52 measures the level of the sump 40 in the lowest part of the aerating tower 35 and regulates via a regulating line 53 the valve 54 the line 3 so that the salt solution quantity flowing out of the line 41 is accommodated to the salt solution quantity flowing in via the line 34.

We claim:
1. A continuous process for removing pollutants from waste gases which pollutants are present in the gas in the form of acid components, the said process comprising
   1. introducing the waste gas into an evaporator tower where the gas is mixed with an aqueous solution of a salt of said acid component;
   2. heat-vaporizing the resulting mixture in said evaporator so as to form salt crystals from said salt solution and withdrawing said salt crystals from the gas substantially without said pollutants and solids from the gas;
   3. passing the gas through a separation device to remove the formed crystals together with solids initially present in the gas prior to passing the gas to an absorption tower;
   4. then passing the now substantially dry gas including residual salt crystal to said absorption tower, introducing an alkaline absorbent into the tower, the absorbent being a liquid or forming a liquid in the tower and being adapted to form salts with said acid component of the gas in the form of an aqueous concentrated solution of the salt and to dissolve residual salt crystals present in said gas and introducing fresh water to the extent necessary to form and maintain the liquid absorbent and aqueous salt solution;
   5. continuously circulating the formed salt solution out of and into the absorption tower;
   6. while continuously withdrawing a controlled amount of said salt solution and recycling said amount into the evaporator tower for said gas-solids separation step and
   7. discharging the pollutant-free gas from the absorption tower.

2. The process of claim 1 wherein the major portion of the acid component of said gas is sulfur dioxide.

3. The process of claim 2 wherein the salt solution withdrawn from the absorption tower is subjected to oxidation prior to recycling it into the evaporation tower so as to convert the sulfite present in the salt solution to sulfate.

4. The process of claim 2 wherein the absorbent is ammonia and the salt crystals recovered from the evaporation tower predominantly consist of ammonium sulfate.

5. The method of claim 4, wherein said ammonia is mixed with said pollutant-containing gas prior to the evaporation step.

6. The process of claim 1 wherein said separation device is an electrostatic separator.

7. The process of claim 1 wherein the gas prior to passing into the absorption tower is subjected to cooling by heat exchange with the gas discharged from the absorption tower.

8. The process of claim 1 wherein the pH of the salt solution withdrawn from the absorption tower is being determined during the operation and the amount of alkaline absorbent introduced into the absorption tower is accordingly adjusted so as to obtain a pH range between 4.0 and 7.8 in the salt solution.

9. The method of claim 8, wherein said pH value is between about 6.5 and 7.5.

10. The method of claim 1, said pollutant-containing gas comprises a hot waste gas; and wherein the heat for the vaporizing step is obtained from said pollutant-containing gas and said heat is sufficient to substantially completely vaporize the liquid in said mixture of gas and solution.

11. The method of claim 1, wherein said salt solution is sprayed into said evaporation tower in finely divided form.

12. The method of claim 1, wherein said water is softened by ion-exchange in an ion-exchange zone.

13. The method of claim 1, wherein the concentration of said salt solution is between about 50 and 98 percent of the saturation value.

14. The method of claim 1, wherein said concentration is between about 85 and 95 percent of said saturation value.

* * * * *

Notice of Adverse Decision in Interference

In Interference No. 101,317, involving Patent No. 4,039,304, H. Bechthold and P. Bottger, METHOD OF REMOVING $SO_2$ AND/OR OTHER ACID COMPONENTS FROM WASTE GASES, final judgment adverse to the patentees was rendered Apr. 17, 1986, as to claims 1, 2, 3, 10 and 11.
[*Official Gazette July 15, 1986.*]

UNITED STATES PATENT AND TRADEMARK OFFICE
CERTIFICATE OF CORRECTION

PATENT NO. : 4,039,304

DATED : August 2, 1977

INVENTOR(S) : Horst Bechthold and Paul Bottger

It is certified that error appears in the above-identified patent and that said Letters Patent is hereby corrected as shown below:

In Claim 1, the last two lines of subparagraph 2, at lines 26-27 of column 2 of said patent, should read:

--substantially without said pollutants --

Signed and Sealed this
Fourth Day of November, 1986

[SEAL]

Attest:

DONALD J. QUIGG

Attesting Officer

Commissioner of Patents and Trademarks

REEXAMINATION CERTIFICATE (622nd)

United States Patent [19]
Bechthold et al.

[11] B1 4,039,304
[45] Certificate Issued Jan. 20, 1987

[54] METHOD OF REMOVING SO$_2$ AND/OR OTHER ACID COMPONENTS FROM WASTE GASES

[75] Inventors: Horst Bechthold, Erftstadt-Friesheim; Paul Bottger, Bensberg-Refrath, both of Fed. Rep. of Germany

[73] Assignee: Maschinenfabrik Buckau R. Wolf Aktiengesellschaft, Grevenbroich, Fed. Rep. of Germany

Reexamination Request:
No. 90/000,893, Nov. 1, 1985

Reexamination Certificate for:
Patent No.: 4,039,304
Issued: Aug. 2, 1977
Appl. No.: 591,624
Filed: Jun. 30, 1975

Certificate of Correction issued Aug. 2, 1977.

[30] Foreign Application Priority Data

Jun. 28, 1974 [DE] Fed. Rep. of Germany ....... 2431130
Apr. 25, 1975 [DE] Fed. Rep. of Germany ....... 2518386

[51] Int. Cl.$^4$ .................. B01D 53/14; B03C 1/00; C01B 17/00
[52] U.S. Cl. .......................... 55/10; 55/73; 55/89; 423/242
[58] Field of Search ............. 55/10, 11, 73, 89, 122, 55/124; 423/242, 512 A, 554, 555

[56] References Cited

U.S. PATENT DOCUMENTS

| | | | |
|---|---|---|---|
| 2,598,116 | 5/1952 | DuBois | 55/73 |
| 2,628,193 | 2/1953 | D'Alelio | 210/38 A X |
| 3,305,307 | 2/1967 | Spormann et al. | 423/512 A |
| 3,405,508 | 10/1968 | Peters et al. | 55/73 |
| 3,456,709 | 7/1969 | Vegeby | 55/122 X |
| 3,485,014 | 12/1969 | Atsukawa et al. | 55/73 |
| 3,533,748 | 10/1970 | Finfer et al. | 423/242 X |
| 3,772,854 | 11/1973 | Tamura et al. | 55/73 |
| 3,785,119 | 1/1974 | McIlvaine | 55/73 X |
| 3,907,526 | 9/1975 | Saleem et al. | 55/73 X |
| 3,929,968 | 12/1975 | Taub | 423/242 |
| 3,932,587 | 1/1976 | Grantham et al. | 423/242 |
| 4,325,713 | 4/1982 | Rosenberg et al. | 423/242 X |

OTHER PUBLICATIONS

Rosenberg et al., Advances in Disposal of Sodium-Based Wastes From Stack Gas Desulfurization Processes, Oct. 73, pp. 1-20, Battelle Columbus Laboratories.

McGraw-Hill, "The Problem Beyond Removal, Proceedings From Electrical World Engineering Management Conference, Waste Disposal in Utility Environmental System," 1973, pp. 281-302.

*Primary Examiner*—Robert H. Spitzer

[57] ABSTRACT

Waste gas is contacted with a solution of a salt from a pollutant of the gas. This solution is obtained from another stage of the process used for cleansing or purifying the gas. The resulting mixture of gas and solution is subjected to vaporization so as to obtain a dry gaseous substance constituted by the waste gas and the evaporated solvent for the salt. The gaseous substance thus formed contains crystals of the salt as well as the pollutant present in the original waste gas. The salt crystals and other solid particles are removed from the gaseous substance in the form of a dry solids mixture. The gaseous substance is subsequently mixed with an absorption fluid such as an ammonia solution in order to wash out and redissolve any salt crystals which may remain in the gaseous substance and in order to remove the pollutant present in the original waste gas from the gaseous substance. The pollutant and the redissolved salt crystals form a salt solution together with the absorption fluid and it is this salt solution which is brought into contact with the waste gas. The gaseous substance is exhausted to the atmosphere after being mixed with the absorption fluid.

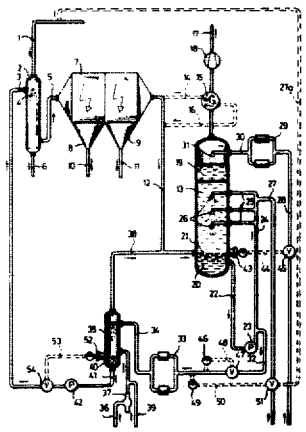

REEXAMINATION CERTIFICATE ISSUED UNDER 35 U.S.C. 307

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claims 1—3, 10 and 11 were previously disclaimed.

Claims 4–9 and 12–14 are cancelled.

* * * * *